(12) United States Patent
Kusakabe et al.

(10) Patent No.: US 11,341,577 B2
(45) Date of Patent: May 24, 2022

(54) MANAGEMENT DEVICE, CRYPTOCURRENCY SYSTEM, AND SYSTEM

(71) Applicant: GVE Ltd., Tokyo (JP)

(72) Inventors: Yu Kusakabe, Tokyo (JP); Koji Fusa, Tokyo (JP); Keita Takamatsu, Tokyo (JP)

(73) Assignee: GVE LTD., Tokyo (JP)

( * ) Notice: Subject to any disclaimer, the term of this patent is extended or adjusted under 35 U.S.C. 154(b) by 169 days.

(21) Appl. No.: 16/816,843

(22) Filed: Mar. 12, 2020

(65) Prior Publication Data

US 2020/0211116 A1 Jul. 2, 2020

Related U.S. Application Data

(63) Continuation of application No. 16/072,975, filed as application No. PCT/JP2017/043716 on Dec. 5, 2017, now Pat. No. 10,628,886.

(51) Int. Cl.
| | | |
|---|---|---|
| *G06Q 40/04* | (2012.01) | |
| *G06Q 20/06* | (2012.01) | |
| *G06Q 20/36* | (2012.01) | |

(52) U.S. Cl.
CPC ......... *G06Q 40/04* (2013.01); *G06Q 20/0658* (2013.01); *G06Q 20/3672* (2013.01)

(58) Field of Classification Search
CPC ............... G06Q 40/04; G06Q 20/0658; G06Q 20/3672; G06Q 20/06
See application file for complete search history.

(56) References Cited

U.S. PATENT DOCUMENTS

| | | | |
|---|---|---|---|
| 9,645,943 B2 * | 5/2017 | Kopylovitz | .......... G06F 3/0631 |
| 10,055,715 B1 | 8/2018 | Grassadonia et al. | |
| 10,108,938 B1 * | 10/2018 | Brock | ................... G06Q 20/06 |

(Continued)

FOREIGN PATENT DOCUMENTS

| | | | | |
|---|---|---|---|---|
| JP | 04-092597 A | | 3/1992 | |
| JP | 2000268308 A | * | 9/2000 | ............... G07F 7/10 |

(Continued)

OTHER PUBLICATIONS

Sungard,AS: What is Hierarchical Storage Managemenr, Aug. 17, 2017, Blog, pp. 1-5 (Year: 2017).*

(Continued)

*Primary Examiner* — Bijendra K Shrestha
(74) *Attorney, Agent, or Firm* — Squire Patton Boggs (US) LLP

(57) ABSTRACT

[Problem] Provided are a management device and a cryptocurrency system capable of smoothly operating an entire system by detecting fraud on cryptocurrencies without using enormous calculation amounts.
[Solution] A management device connected to a plurality of user devices via a network, the management device including: an issued information storage area that stores a cryptocurrency ID of an issued cryptocurrency; an account information storage area that stores account information in association with one or a plurality of cryptocurrency IDs; and a history information storage area that stores history information of a cryptocurrency in association with a cryptocurrency ID.

6 Claims, 8 Drawing Sheets

(56) References Cited

U.S. PATENT DOCUMENTS

| | | | |
|---|---|---|---|
| 10,915,891 | B1 | 2/2021 | Winklevoss et al. |
| 2005/0097132 | A1* | 5/2005 | Cochran ............... G06F 3/0605 |
| 2006/0064441 | A1* | 3/2006 | Yamamoto ............. G06F 16/10 |
| 2010/0106908 | A1* | 4/2010 | Mizuno .................. G06F 3/061 |
| | | | 711/114 |
| 2015/0058289 | A1 | 2/2015 | Do et al. |
| 2015/0324789 | A1 | 11/2015 | Dvorak et al. |
| 2015/0365283 | A1 | 12/2015 | Ronca et al. |
| 2016/0085468 | A1 | 3/2016 | Crescenti et al. |
| 2016/0292680 | A1 | 10/2016 | Wilson, Jr. et al. |
| 2017/0221029 | A1 | 8/2017 | Lund et al. |
| 2017/0337534 | A1 | 11/2017 | Goeringer et al. |
| 2018/0101844 | A1 | 4/2018 | Song et al. |
| 2019/0012660 | A1 | 1/2019 | Masters |
| 2019/0080411 | A1 | 3/2019 | Pierce et al. |
| 2019/0114707 | A1 | 4/2019 | McSheehan et al. |

FOREIGN PATENT DOCUMENTS

| | | | | |
|---|---|---|---|---|
| JP | 2002-288573 | A | 10/2002 | |
| JP | 4001452 | B2 | 10/2007 | |
| JP | 2011 48850 | A * | 3/2011 | ............. G06F 21/22 |
| JP | 2016-151802 | A | 8/2016 | |
| JP | 2016-162361 | A | 9/2016 | |
| JP | 2016162361 | A * | 9/2016 | ............... G06Q 4/06 |
| JP | 2017-054339 | A | 3/2017 | |
| WO | WO-03071388 | A2 * | 8/2003 | ............. G06Q 10/10 |
| WO | 2019073469 | A1 | 4/2019 | |

OTHER PUBLICATIONS

Serapiglia et al.: Cryptocurrencies: Core Technology and Information System Fundamentals Enabling Currency Without Borders, May 2015, Information Systems Education Journal (ISEDJ), 13 (3), pp. 43-52 (Year: 2015).*

Conti et al.: A Survey on Security and Privacy Issues of Bicoin, Dec. 27, 2017, pp. 1-36 (Year: 2017).* dni.gov: Risk and Vulnerabilities of Virtual Currency: Cryptocurrency as a Payment Method, Aug. 15, 2017, pp. 1-40, 2017. No copy provided, per MPEP 609.

Harvey, Tim: Cryptocurrency opening fraud gates, May/Jun. 2014, Fraud Magazine, pp. 1-3, 2014. No copy provided, per MPEP 609.

Krishnan et al.: Cryptocurrency Mining—Transition to Cloud, International Journal of Advanced Computer Science and Applications, vol. 6, No. 9, pp. 115-124, 2015. No copy provided, per MPEP 609.

Harwick, Cameron: Cryptocurrency and the Problem of Intermediation, The Independent Review, vol. 20, No. 4, pp. 569-588, Spring 2016. No copy provided, per MPEP 609.

Antonopoulos, Andreas M., "Mastering Bitcoin: Unlocking Digital Cryptocurrencies", Dec. 2014, pp. 1-272. No copy provided, per MPEP 609.

Lundbaek, Leif-Nissen et al., "Centrally Governed Blockchains: Optimizing Security, Cost, and Availability", Department of Computing, Imperial College London, London SW7 2AZ, United Kingdom, pp. 578-599. No copy provided, per MPEP 609.

Danezis, George et al., "Centrally Banked Cryptocurrencies", University College London, Dec. 18, 2015, pp. 1-14. No copy provided, per MPEP 609.

International Search Report and Written Opinion dated Jan. 23, 2018 corresponding to International Patent Application No. PCT/JP2017/043716. No copy provided, per MPEP 609.

Wikipedia, entry for Blockchain, Jun. 23, 2018, https://ja.wikipedia.org/wiki/ブロックチェーン> No copy provided, per MPEP 609.

English version in Wikipedia of Blockchain, Jul. 10, 2018, https://en.wikipedia.org/wiki/Blockchain. No copy provided, per MPEP 609.

US Office Action corresponding to co-pending U.S. Appl. No. 16/816,809, dated Oct. 29, 2021.

Gantori et al., "Cryptocurrencies", Beneath the bubble, Oct. 12, 2017, UBS, 23 pages.

Anonymous: "Tree (data structure)—Wikipedia, the free encyclopedia", Aug. 7, 2016, XP055300500, Retrieved from the Internet, URL: https://en.wikipedia.org/w/index.php?title=Tree_(data_structure)&printable=yes [retrieved on Sep. 7, 2016].

* cited by examiner

FIG. 1
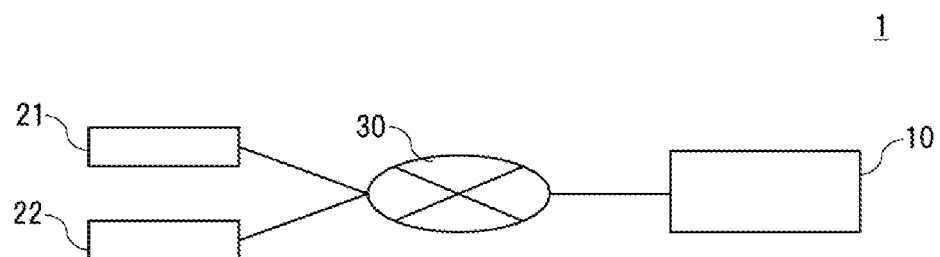
FIG. 2
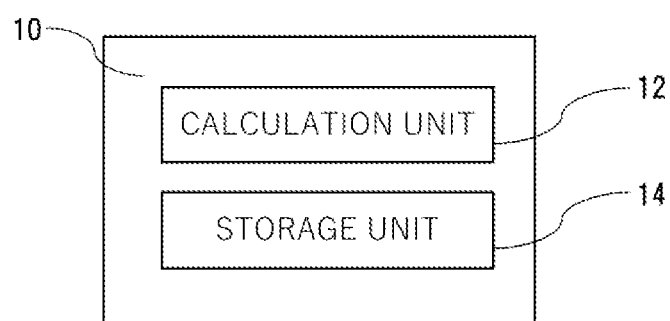
FIG. 3A
| CRYPTOCURRENCY ID | ISSUE DATE AND TIME | ISSUE AMOUNT | PRICE RECEIVED | 141 |
|---|---|---|---|---|
| 0001 | 2018/01/02 01:02:03 | 100 YEN | YES | |
| 0002 | 2018/01/03 18:01:02 | 200 YEN | YES | |

FIG. 3B

| CRYPTOCURRENCY ID | ACCOUNT NUMBER | OWNER'S FULL NAME OR DESIGNATION |
|---|---|---|
| 0001 | 1111 | AAA |
| 0002 | 2222 | BBB |

| CRYPTOCURRENCY ID | TYPE OF HISTORY | ACCOUNT NUMBER | DATE AND TIME OF HISTORY |
|---|---|---|---|
| 0001 | ISSUE | 0000(OUT), 1111(IN) | 2018/01/02 01:02:03 |
| 0001 | BUYING AND SELLING | 1111(OUT), 3333(IN) | 2018/01/04 03:03:03 |

| ASSET BALANCE | ACCOUNT NUMBER | RECEPTION DATE AND TIME |
|---|---|---|
| 100 YEN | 1111 | 2018/01/02 01:02:03 |
| 300 YEN | 2222 | 2018/01/03 18:01:02 |

144

MANAGEMENT DEVICE, CRYPTOCURRENCY SYSTEM, AND SYSTEM

CROSS-REFERENCE TO RELATED APPLICATIONS

This is a continuation application of U.S. patent application Ser. No. 16/072,975, filed on Jul. 26, 2018, which is a 371 application of PCT International Patent Application No. PCT/JP2017/043716, filed on Dec. 5, 2017. The disclosures of the prior applications are hereby incorporated by reference in their entirety.

TECHNICAL FIELD

The present invention relates to a management device, a cryptocurrency system, and a system.

BACKGROUND ART

There have been known cryptocurrency systems in which all transaction history data from the past to the present are shared among a plurality of user devices and special hash values generated by processing called mining are added to new transaction history data added to the shared transaction history data so that the falsification of the shared transaction history data becomes difficult (see NPL 1).

CITATION LIST

Non Patent Literature

[NPL 1] free encyclopedia "Wikipedia," Block chain, [searched on Dec. 3, 2017], the Internet <URL: https://ja.wikipedia.org/wiki/ブロックチェーン>

SUMMARY OF INVENTION

Technical Problem

However, since calculation amounts of special hash values by mining become enormous in the above conventional cryptocurrency systems, the entire systems may not be smoothly operated.

Solution to Problem

The above problem can be addressed by the following means.

A management device connected to a plurality of user devices via a network, the management device including: an issued information storage area that stores a cryptocurrency ID of an issued cryptocurrency; an account information storage area that stores account information in association with one or a plurality of cryptocurrency IDs; and a history information storage area that stores history information of a cryptocurrency in association with a cryptocurrency ID.

A management device connected to a plurality of user devices via a network, the management device including: an issued information storage area that stores a cryptocurrency ID of an issued cryptocurrency; and an asset information storage area that stores an asset balance, wherein the management device determines propriety of issue conditions including reception of a price of a cryptocurrency as a condition when receiving a cryptocurrency issue request specifying account information from the user devices, and stores a new cryptocurrency ID in the issued information storage area when the issue conditions are met, and wherein the management device determines propriety of buying intervention conditions including a condition in which a target price is a prescribed buying intervention setting price or less when receiving a sell order specifying account information from one of the user devices, and subtracts a price for which the buying intervention has been established from the asset balance stored in the asset information storage area when the buying intervention conditions are met.

Advantageous Effects of Invention

According to an embodiment of the present invention, a management device can detect fraud on cryptocurrencies using cryptocurrency IDs without using enormous calculation amounts. Accordingly, a management device and a cryptocurrency system capable of smoothly operating an entire system can be provided.

BRIEF DESCRIPTION OF DRAWINGS

FIG. 1 is a schematic diagram showing a configuration example of a cryptocurrency system according to a first embodiment.

FIG. 2 is a schematic diagram showing a configuration example of the management device according to the first embodiment.

FIG. 3A is a schematic diagram showing an example of an issued information storage area.

FIG. 3B is a schematic diagram showing an example of an account information storage area.

FIG. 3C is a schematic diagram showing an example of a history information storage area.

FIG. 3D is a schematic diagram showing an example of an asset information storage area.

DESCRIPTION OF EMBODIMENTS

Figure 3E:
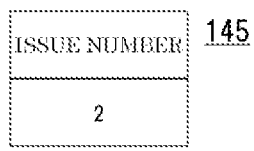
FIG. 3E is a schematic diagram showing an example of a history information storage area.

Cryptocurrency System 1 According to First Embodiment

FIG. 1 is a schematic diagram showing a configuration example of a cryptocurrency system according to a first embodiment. As shown in FIG. 1, a cryptocurrency system 1 according to the first embodiment includes a management device 10 and a plurality of user devices 21 and 22 connected to the management device 10 via a network 30. Hereinafter, the cryptocurrency system 1 will be described in detail.

(User Devices 21 and 22)

The user devices 21 and 22 are devices managed by users. Examples of the users include, besides individuals and corporations, central banks, private banks, and organizations such as exchanges in all the countries of the world. Besides desktop computers or laptop computers, smart phones or the like can be used as the user devices 21 and 22. Examples of the network 30 that connects the management device 10 to the user devices 21 and 22 include the Internet or the like.

(Management Device 10)

The management device 10 is a device that manages cryptocurrencies. Examples of the management include the management of issue, the management of buying and selling, the management of values (such as the maintenance of the values of the cryptocurrencies), and the management of histories. Based on its centralized management of the cryptocurrencies using cryptocurrency IDs in the embodiment, the management device 10 can easily detect fraud on the cryptocurrencies while reducing calculation amounts of an entire system.

The management device 10 is managed by the managers of the cryptocurrencies. Examples of the managers include central banks, private banks, and organizations such as exchanges in all the countries of the world. The managers do not include individuals. It does not matter if the managers themselves directly operate the management device 10 or if any person operates the management device 10 according to instructions or the like under a commission or the like from the managers so long as the managers take responsibility for the management of the management device 10.

The management device 10 may be a single device or may include a plurality of devices that cooperatively operates so that a single device can be considered to operate. Further, the management device 10 can include a plurality of management devices arranged on the network 30. In this case, each of the plurality of management devices 10 may be a single device or may include a plurality of devices that cooperatively operates so that a single device can be considered to operate.

FIG. 2 is a schematic diagram showing a configuration example of the management device according to the first embodiment. As shown in FIG. 2, the management device 10 has a calculation unit 12 and a storage unit 14. The calculation unit 12 is, for example, a CPU, and the storage unit 14 is, for example, a unit such as a RAM and a hard disk capable of reading and writing information. The storage unit 14 may be included in the management device 10 (see FIG. 2) or may be externally attached to the management device 10. Further, the storage unit 14 may be a unit that is accessed by the calculation unit 12 of the management device 10 via the network 30. Each of the calculation unit 12 and the storage unit 14 may be a single unit or may include a plurality of units that cooperatively operates so that a single unit can be considered to operate.

FIG. 3A is a schematic diagram showing an example of an issued information storage area, FIG. 3B is a schematic diagram showing an example of an account information storage area, and FIG. 3C is a schematic diagram showing an example of a history information storage area. As shown in FIGS. 3A to 3C, the storage unit 14 of the management device 10 has an issued information storage area 141 that stores the cryptocurrency IDs of issued cryptocurrencies, an account information storage area 142 that stores account information in association with one or a plurality of cryptocurrency IDs, and a history information storage area 143 that stores the history information of cryptocurrencies in association with cryptocurrency IDs.

(Issued Information Storage Area 141)

The issued information storage area 141 stores the cryptocurrency IDs of issued cryptocurrencies. The cryptocurrency IDs are data unique to individual cryptocurrencies. When one of the cryptocurrency IDs is specified, one of the cryptocurrencies can be uniquely specified. The cryptocurrency IDs are allocated to all the issued cryptocurrencies.

The issued information storage area 141 can store issued information in association with the cryptocurrency IDs. The issued information includes, for example, the issue prices of individual cryptocurrencies, information as to whether the prices of the cryptocurrencies have been received, the dates and times of the issue of the cryptocurrencies, or the like.

The issue prices of the individual cryptocurrencies are preferably increased as the number of the issued cryptocurrencies increases. For example, when it is assumed that three cryptocurrencies are issued, the issue price of the firstly-issued cryptocurrency is 100 yen, the issue price of the secondly-issued cryptocurrency is 200 yen, and the issue price of the thirdly-issued cryptocurrency is 300 yen. Thus, the earlier you receive the issue of the cryptocurrencies, the more you can get the cryptocurrencies at a lower price, and the widespread use of the cryptocurrencies can be accelerated.

(Account Information Storage Area 142)

The account information storage area 142 stores the account information of managers or users in association with one or a plurality of cryptocurrency IDs. The account information is information for specifying the issue destinations, remittance sources, or remittance destinations of cryptocurrencies. Examples of the account information include, besides account numbers, deposit addresses, or the like with which the cryptocurrencies are to be deposited, the information of owners of the cryptocurrencies such as full names and designations, or the like. Note that when the information of the owners is included in the account information and made open to public, the owners of the cryptocurrencies are disclosed, whereby money laundering or the like can be effectively prevented. On the other hand, when the information of the owners is not included in the account information or when the information of the owners is included in the account information but is not made open to public, the issue, remittance, or the like of the cryptocurrencies is allowed but the owners are not disclosed, whereby the anonymity of the cryptocurrencies can be maintained.

(History Information Storage Area 143)

The history information storage area 143 stores the history information of cryptocurrencies in association with cryptocurrency IDs. The management device 10 can easily detect fraud on the individual cryptocurrencies by verifying the consistency between the history information stored in the history information storage area 143 with the cryptocurrency IDs. Further, the management device 10 can determine whether the information stored in the history information storage area 143 has been falsified by comparing the information stored in the history information storage area 143 with the information stored in the issued information storage area 141 and the information stored in the account information storage area 142 and determining whether there is any contradiction between the information. In making the determination, the management device 10 has no need to calculate special harsh values requiring enormous calculation amounts.

Examples of the history information of the cryptocurrencies include the types of histories, account information associated with the histories, and the dates and times of the histories. The types of the histories include, for example, information indicating that the cryptocurrencies have been issued, information indicating that the buying and selling of the cryptocurrencies (for example, the remittance of the cryptocurrencies between the account numbers of the users) has been established, information indicating that cryptocurrencies-buying intervention (for example, the remittance of the cryptocurrencies from the account numbers of the users to the account number of the management device) has been conducted, information indicating that cryptocurrencies-selling intervention (for example, the remittance of the cryptocurrencies from the account number of the management device to the account numbers of the users) has been conducted, or the like. Thus, the management device 10 can determine which of the cryptocurrencies of the cryptocurrency IDs have been targeted, determine which account information (for example, from account information A to account information B) has been used, determine which processing of the history types (for example, the transfer of the cryptocurrencies) has been performed, and determine what time the processing has been performed. In FIG. 3C, "0000" indicates the account number of a manager. Further, (out) indicates the account number of a remittance source, and (in) indicates the account number of a remittance destination. Note that the remittance indicates the transfer of the cryptocurrencies.

As described above, the storage unit 14 of the management device 10 has the three storage areas of the issued information storage area 141, the account information storage area 142, and the history information storage area 143. Further, each of the three storage areas stores the cryptocurrency IDs. Thus, the management device 10 can confirm whether the information stored in the issued information storage area 141, the information stored in the account information storage area 142, and the information stored in the history information storage area 143 have been falsified by comparing the information stored in the history information storage area 143 with the information stored in the issued information storage area 141 and/or the information stored in the account information storage area 142 with the cryptocurrency IDs as keys and determining whether there is any contradiction between the information rather than relying only on the consistency of the information stored in the history information storage area 143. For example, when the history information storage area 143 describes history information indicating a sell from account information A to account information B in association with the cryptocurrency ID 3 but the account information storage area 142 stores the account information A in association with the cryptocurrency ID 3, the management device 10 can determine that one of the information of the account information storage area 142 and the information of the history information storage area 143 may be falsified and suspend or stop processing on the cryptocurrency of the cryptocurrency ID 3. Further, even if one of the three storage areas is falsified, the management device 10 is allowed to correct the falsified information into proper one using the information stored in the remaining two storage areas.

(Asset Information Storage Area 144 and Issue Number Storage Area 145)

FIG. 3D is a schematic diagram showing an example of an asset information storage area 144, and FIG. 3E is a schematic diagram showing an example of the history information storage area 143. As shown in FIGS. 3D and 3E, the storage unit 14 of the management device 10 can also have the asset information storage area 144 that stores asset balances, an issue number storage area 145 that stores the number of issued cryptocurrencies, or the like. The asset balances are information indicating the total of values paid from users to managers as the prices of the cryptocurrencies. In the example shown in FIG. 3D, asset balances associated with the latest reception dates and times indicate the latest asset balances.

For example, when it is assumed that totally three cryptocurrencies have been issued in which the issue price of the first cryptocurrency is 1,000 yen, the issue price of the second cryptocurrency is 1,500 yen, and the issue price of the third cryptocurrency is 2,000 yen and that the prices of the cryptocurrencies are paid from a user to a manager, an asset balance is, for example, 4,500 yen and the number of the issued cryptocurrencies is, for example, three. Note that the prices of the cryptocurrencies are values set according to the issue prices of the cryptocurrencies and equal, for example, the issue prices of the cryptocurrencies. Besides currencies such as yen and dollar, values such as electric money and points can be used as the prices.

In the asset balances, the prices of the cryptocurrencies, the account information of users having paid the prices of the cryptocurrencies, reception dates and times at which the prices have been received, or the like can be stored in association with each other. Thus, the management device 10 can easily specify who has paid the prices, when the prices have been paid, and how much the prices have been paid. For example, when the prices have been already received or when it is expected that the prices will be reliably received, the management device 10 can add the prices of issue to the asset balances. Further, the management device 10 can store the prices and the account information of users in association with the asset balances after the addition.

Each of the storage areas described above may be a physically single storage area or may include a plurality of storage areas handled as a substantially single area when the calculation unit 12 performs prescribed processing.

In the embodiment as well, hash values having large calculation amounts may be generated using all information from the past to the present stored in the storage areas as in mining and contained in information that is to be newly stored in the storage areas. Thus, the falsification of the information stored in the storage areas can be further prevented. However, according to the embodiment, fraud on the cryptocurrencies can be detected without relying on a falsification prevention device that uses such hash values having large calculation amounts as described above. Accordingly, even when hash values are used, it is preferable to use hash values having small calculation amounts or the like rather than using hash values having large calculation amounts.

(Operation Example of Management Device 10: Issue of Cryptocurrency)

Figure 4:
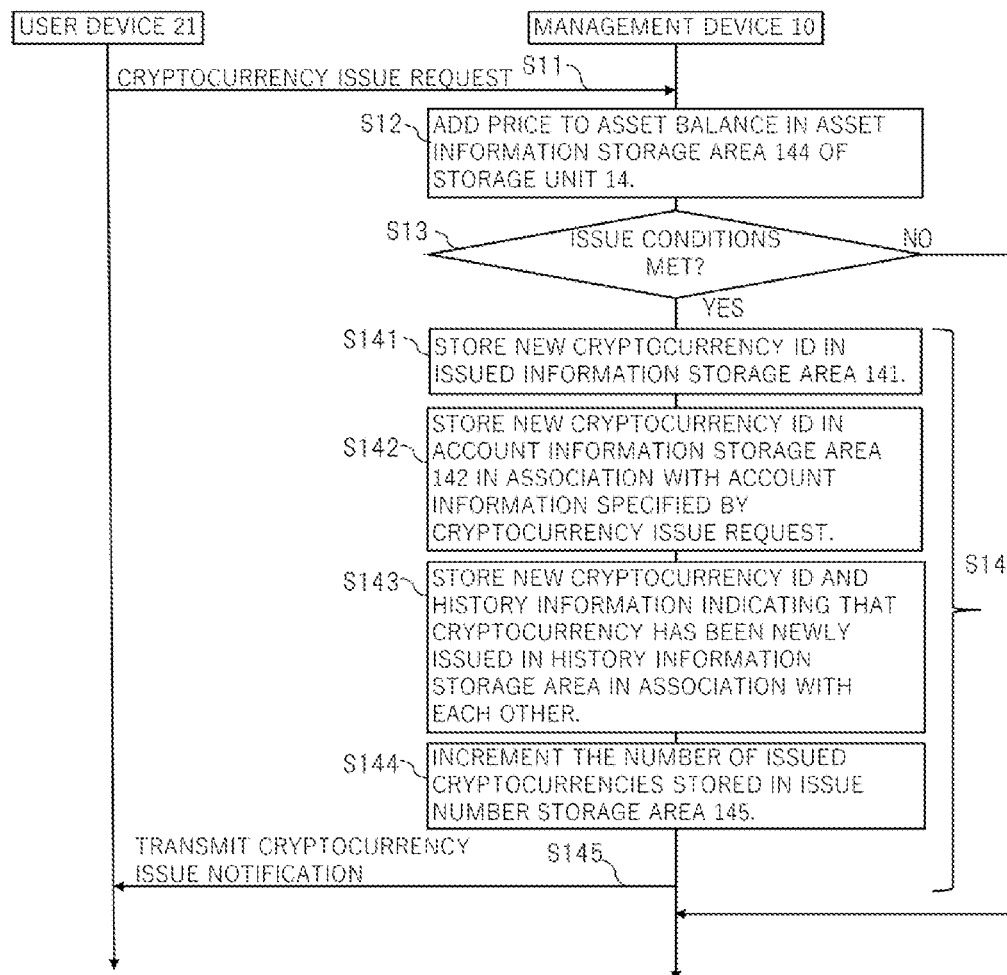
FIG. 4 is a sequence diagram for describing an operation example (the issue of a cryptocurrency) of the management device according to the first embodiment.

FIG. 4 is a sequence diagram for describing an operation example (the issue of a cryptocurrency) of the management device according to the first embodiment. Hereinafter, a description will be given, with reference to FIG. 4, of an operation example of the management device 10 in a case in which a cryptocurrency is issued to the user device 21.

(Step S11)

First, the management device 10 receives a cryptocurrency issue request specifying account information from the user device 21. Thus, the issue of a cryptocurrency is requested from the user device 21 to a manager. The cryptocurrency issue request may specify a desired issue number, besides the account information.

(Step S12)

When the manager receives the price of the cryptocurrency from a user, the management device 10 preferably adds the price to an asset balance in the asset information storage area 144 of the storage unit 14 (step S12). Thus, the issue of the cryptocurrency and the asset balance of the manager can be accurately linked to each other. Further, buying intervention that will be described later can be prevented from being unlimitedly performed. Note that this step may be performed before the reception of the price or after cryptocurrency issue processing.

(Steps S13 and S14)

Next, the management device 10 determines the propriety of issue conditions including the receiving condition of the price of the cryptocurrency (step S13), and performs the cryptocurrency issue processing (step S14) when the issue conditions are met. Provided that the price is received, the value of the cryptocurrency can be stabilized with the price regarded as the support of the value of the cryptocurrency. Further, the buying intervention that will be described later can be limited.

The propriety of the receiving condition can be determined based on whether the price of the cryptocurrency has been already received or whether it is expected that the price will be reliably received. Specific modes for the determination are not particularly limited. However, the determination can be made based on whether the price has been stored in the asset information storage area 144 in association with the account information specified by the cryptocurrency issue request, a numeric value indicating the credibility of the user, whether the user corresponds to a user stored in the storage unit 14 in advance as a person with the credibility, whether it can be evaluated that the price of the cryptocurrency has been substantially received, or the like.

In addition, the issue conditions preferably include a condition in which the number of issued cryptocurrencies stored in the issue number storage area 145 is a prescribed upper limit value or less, or a condition in which, when a desired issue number of N (N≥2) is specified by the cryptocurrency issue request, the sum of the number of the issued cryptocurrencies stored in the issue number storage area 145 and the desired issue number is a prescribed upper limit value or less. The prescribed upper limit value is determined according to market trends.

Moreover, the issue conditions preferably include a condition in which the market price of the cryptocurrency is an issue price or more. Thus, the number (supply amount) of the issued cryptocurrencies is limited according to the market price, whereby the value of the cryptocurrency can be easily maintained. The market price is transmitted to the management device 10 from, for example, a server or the like on the network 30.

Hereinafter, a description will be given of the cryptocurrency issue processing (step S14).

(Step S141)

First, the management device 10 stores a new cryptocurrency ID in the issued information storage area 141. Thus, the new cryptocurrency ID is issued, and the fact that the new cryptocurrency ID has been issued is recorded on the management device 10. This step includes, besides a case in which the new cryptocurrency ID is actually stored in the issued information storage area 141, a case in which the information of the issued information storage area 141 is so updated that an unissued cryptocurrency ID having been already stored in the issued information storage area 141 will be handled as an issued cryptocurrency ID. The new cryptocurrency ID used to be actually stored in the former case may be generated by the management device 10 on a case-by-case basis in this step. Alternatively, usable unissued cryptocurrency IDs may be stored in advance in the storage unit 14 or the like of the management device 10, so that the management device 10 selects one of the IDs randomly or based on a prescribed rule on a case-by-case basis.

(Step S142)

Next, the management device 10 stores the new cryptocurrency ID in the account information storage area 142 in association with the account information specified by the cryptocurrency issue request. Thus, the owner of the newly-issued cryptocurrency is recorded on the management device 10.

(Step S143)

Then, the management device 10 stores the new cryptocurrency ID and history information indicating that the cryptocurrency has been newly issued in the history information storage area in association with each other. Thus, the fact that the cryptocurrency has been newly issued is recorded on the management device 10.

(Step S144)

The management device 10 preferably increments the number of the issued cryptocurrencies stored in the issue number storage area 145. Thus, the number of the issued cryptocurrencies can be managed, whereby the limitation of the number of the issued cryptocurrencies is made possible. The management device 10 increments the number of the issued cryptocurrencies by one when the desired number of the issued cryptocurrencies is not specified by the cryptocurrency issue request or when 1 is specified as the desired number of the cryptocurrencies by the cryptocurrency issue request. Further, when a desired issue number of N (N≥2) is specified by the cryptocurrency issue request, the management device 10 increments the number of the issued cryptocurrencies by N.

(Step S145)

The management device 10 preferably transmits a cryptocurrency issue notification to the user device 21. Thus, the user of the user device 21 is notified of the issue of the cryptocurrency.

(Mediation of Buying and Selling of Cryptocurrency)

Figure 5:
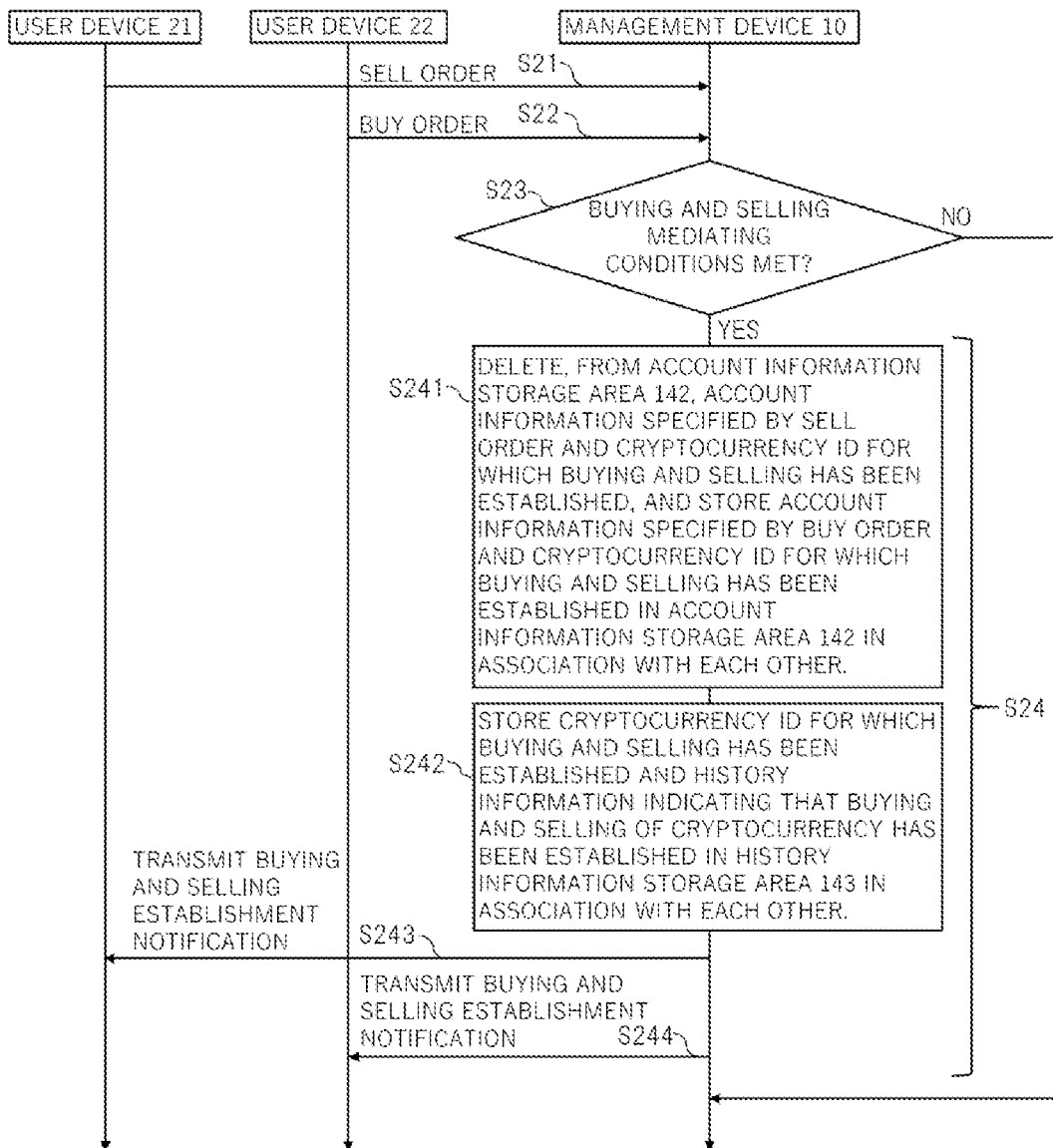
FIG. 5 is a sequence diagram for describing an operation example (the mediation of the buying and selling of a cryptocurrency) of the management device according to the first embodiment.

FIG. 5 is a sequence diagram for describing an operation example (the mediation of the buying and selling of a cryptocurrency) of the management device according to the first embodiment. Hereinafter, a description will be given, with reference to FIG. 5, of an operation example of the management device 10 in a case in which the buying and selling of a cryptocurrency is performed between the user devices 21 and 22.

(Steps S21 and S22)

First, the management device 10 receives a sell order specifying account information from the user device 21 (step S21) and receives a buy order specifying account information from the user device 22 (step S22). Thus, the user device 21 requests the management device 10 to sell a cryptocurrency, and the user device 22 requests the management device 10 to buy the cryptocurrency. The sell order may specify a desired sell number, besides the account information. The buy order may specify a desired buy number, besides the account information.

(Steps S23 and S24)

Next, the management device 10 determines the propriety of buying and selling mediating conditions including conditions in which the account information specified by the sell order is stored in the account information storage area 142 so as to be associated, a cryptocurrency ID stored in the account information storage area 142 in association with the account information specified by the sell order is stored in the issued information storage area 141, and the cryptocurrency ID stored in the account information storage area 142 in association with the account information specified by the sell order is stored in the history information storage area 143 in association with history information (step S23). When the conditions are met, the management device 10 performs buying and selling mediating processing (step S24) with the determination that the buying and selling of the cryptocurrency ID stored in the account information storage area 142 in association with the account information specified by the sell order is established. When a plurality of cryptocurrency IDs is stored in the account information storage area 142 in association with the account information specified by the sell order, the management device 10 can perform the buying and selling mediating processing (step S24) on one cryptocurrency ID or a plurality of cryptocurrency IDs with the determination that the buying and selling for the one cryptocurrency ID or the plurality of cryptocurrency IDs is established. Hereinafter, a description will be given of the buying and selling mediating processing (step S24).

(Step S241)

First, the management device 10 deletes, from the account information storage area 142, the account information specified by the sell order and the cryptocurrency ID for which the buying and selling has been established, and stores the account information specified by the buy order and the cryptocurrency ID for which the buying and selling has been established in the account information storage area 142 in association with each other (step S241). Thus, the cryptocurrency is transferred from the user of the user device 21 acting as a seller to the user of the user device 21 acting as a buyer (remittance is completed), and the fact that the cryptocurrency has been transferred is recorded on the management device 10.

(Step S242)

Next, the management device 10 stores the cryptocurrency ID for which the buying and selling has been established and history information indicating that the buying and selling of the cryptocurrency has been established in the history information storage area 143 in association with each other. Thus, the fact that the buying and selling (remittance) of the cryptocurrency has been established is recorded on the management device 10.

(Steps S243 and S244)

The management device 10 preferably transmits a buying and selling establishment notification to the user devices 21 and 22. Thus, the users of the user devices 21 and 22 are notified of the establishment of the buying and selling of the cryptocurrency.

(Cryptocurrency Buying Intervention)

Figure 6:
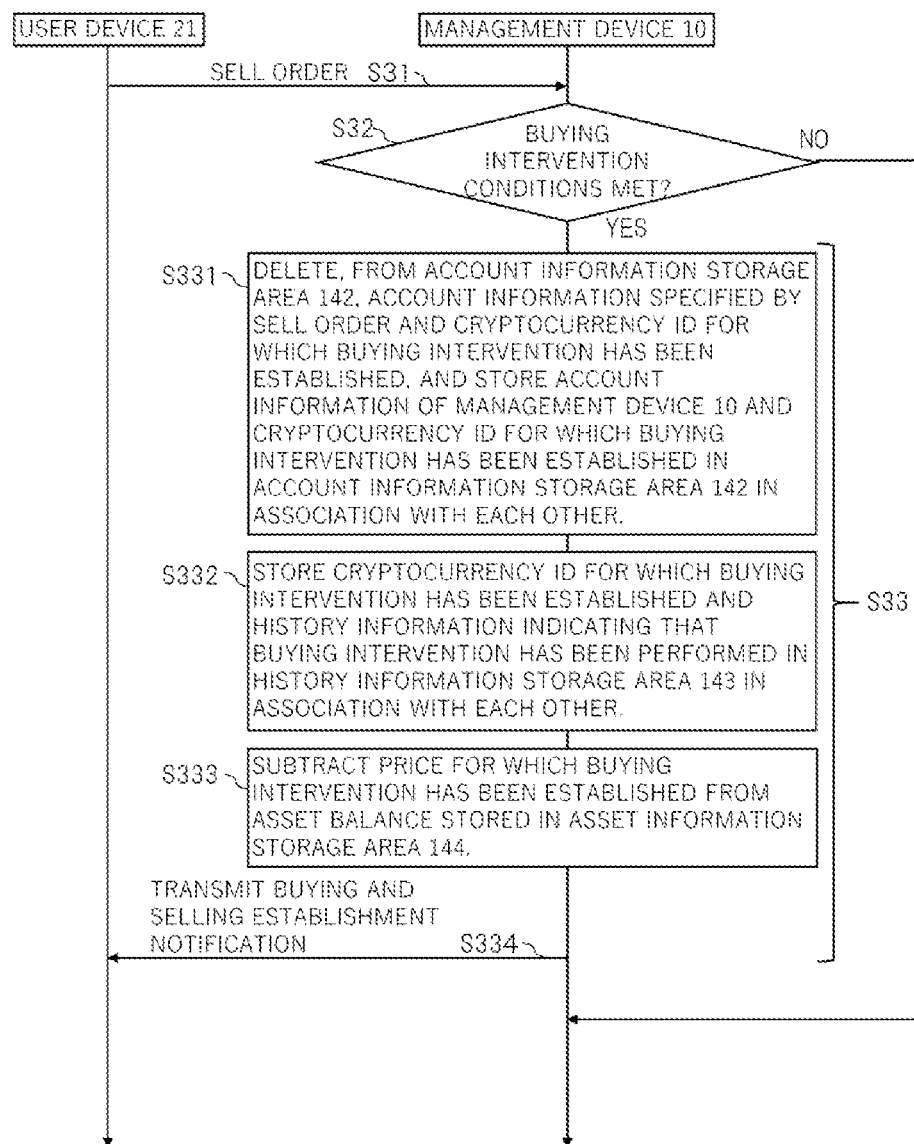
FIG. 6 is a sequence diagram for describing an operation example (buying intervention of a cryptocurrency) of the management device according to the first embodiment.

FIG. 6 is a sequence diagram for describing an operation example (buying intervention processing) of the management device according to the first embodiment. Hereinafter, a description will be given, with reference to FIG. 6, of an operation example of the management device 10 in a case in which the management device 10 performs buying intervention.

(Step S31)

First, the management device 10 receives a sell order specifying account information. Thus, the user device 21 requests the manager to buy a cryptocurrency. The sell order may also specify a desired sell number, besides the account information.

(Step S32)

Next, the management device 10 determines the propriety of buying intervention conditions including conditions in which a target price is a prescribed buying intervention setting price or less, the account information specified by the sell order is stored in the account information storage area 142 so as to be associated, a cryptocurrency ID stored in the account information storage area 142 in association with the account information specified by the sell order is stored in the issued information storage area 141, and the cryptocurrency ID stored in the account information storage area 142 in association with the account information specified by the sell order is stored in the history information storage area 143 in association with history information (step S32). When the buying intervention conditions are met, the management device 10 performs buying intervention processing (step S33) with the determination that the buying intervention for the cryptocurrency ID stored in the account information storage area 142 in association with the account information specified by the sell order is established. When a plurality of cryptocurrency IDs is stored in the account information storage area 142 in association with the account information specified by the sell order, the management device 10 can perform the buying intervention processing (step S33) on one cryptocurrency ID or a plurality of cryptocurrency IDs with the determination that the buying intervention for the one cryptocurrency ID or the plurality of cryptocurrency IDs is established. Thus, the management device 10 is allowed to automatically perform the buying intervention processing (without someone's help) according to the establishment of prescribed conditions and can promptly and accurately prevent drop in the price of the cryptocurrency. Hereinafter, a description will be given of the buying intervention processing (step S33).

The buying intervention conditions preferably include conditions in which an asset balance stored in an asset balance stored in the asset information storage area 144 is a target price or more, or, when a desired sell number of N (N≥2) is specified by the sell order, the asset balance stored in the asset information storage area 144 is the product of the desired sell number and the target price or more. Thus, the buying intervention processing can be performed within the range of the asset balance of the manager. Accordingly, the buying intervention can be prevented from being unlimitedly performed.

The target price may be, for example, the market price of the cryptocurrency transmitted from a server or the like on the network 30 to the management device 10 or a sell order price specified by the sell order. The buying intervention setting price is, for example, input in advance to the management device 10 by the manager and stored in the storage unit 14 of the management device 10.

(Step S331)

First, the management device 10 deletes, from the account information storage area 142, the account information specified by the sell order and the cryptocurrency ID for which the buying intervention has been established, and stores the account information of the management device 10 and the cryptocurrency ID for which the buying intervention has been established in the account information storage area 142 in association with each other (step S331). Thus, the cryptocurrency is transferred from the user of the user device 21 acting as a seller to the manager acting as a buyer, and the fact that the cryptocurrency has been transferred is recorded on the management device 10.

(Step S332)

Next, the management device 10 stores the cryptocurrency ID for which the buying intervention has been performed and history information indicating that the buying intervention has been performed in the history information storage area 143 in association with each other. Thus, the fact that the buying intervention for the cryptocurrency has been performed is recorded on the management device 10.

(Step S333)

The management device 10 preferably subtracts a price for which the buying intervention has been established from the asset balance stored in the asset information storage area 144 (step S333). When a desired sell number of N (N≥2) is specified by the sell order, the management device 10 subtracts the product of the desired sell number and the price for which the buying intervention has been established from the asset balance stored in the asset information storage area 144. Thus, the asset balance of the manager can be accurately managed.

(Step S334)

The management device 10 preferably transmits a buying and selling establishment notification to the user device 21. Thus, the user of the user device 21 is notified of the establishment of the buying and selling of the cryptocurrency.

(Cryptocurrency Selling Intervention)

Figure 7:
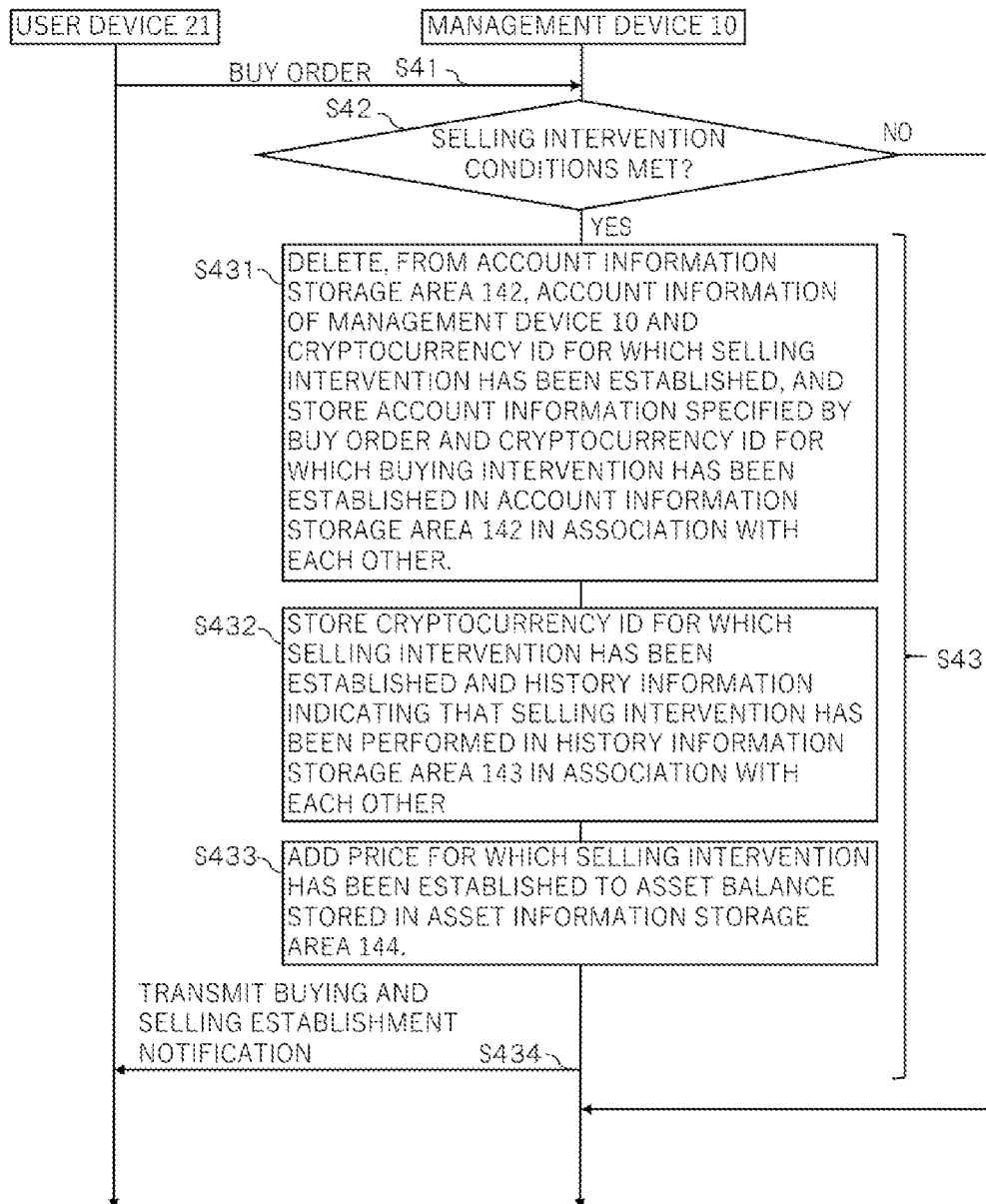
FIG. 7 is a sequence diagram for describing an operation example (selling intervention of a cryptocurrency) of the management device according to the first embodiment.

FIG. 7 is a sequence diagram for describing an operation example (selling intervention processing) of the management device according to the first embodiment. Hereinafter, a description will be given, with reference to FIG. 7, of an operation example of the management device 10 in a case in which the management device 10 performs selling intervention.

(Step S41)

First, the management device 10 receives a buy order specifying account information from the user device 21. Thus, the user device 21 requests the manager to buy a cryptocurrency. The buy order may also specify a desired buy number, besides the account information.

(Steps S42 and S43)

Next, the management device 10 determines the propriety of selling intervention conditions including a condition in which a target price is a prescribed selling intervention setting price or more (step S42). When the selling intervention conditions are met, the management device 10 performs selling intervention processing (step S43) with the determination that the selling intervention for a cryptocurrency ID stored in the account information storage area 142 in association with the account information of the management device 10 is established. When a plurality of cryptocurrency IDs is stored in the account information storage area 142 in association with the account information of the management device 10, the management device 10 can perform the selling intervention processing (step S43) on one cryptocurrency ID or a plurality of cryptocurrency IDs with the determination that the selling intervention for the one cryptocurrency ID or the plurality of cryptocurrency IDs is established. Thus, the management device 10 is allowed to automatically perform the selling intervention processing (without someone's help) according to the establishment of prescribed conditions. Hereinafter, a description will be given of the selling intervention processing (step S43).

The selling intervention conditions further preferably include a condition in which the target price is the issue price of a cryptocurrency, which is stored in the issued information storage area in association with the cryptocurrency ID of the finally-issued cryptocurrency, or more.

The target price may be, for example, the market price of the cryptocurrency transmitted from a server or the like on the network 30 to the management device, or a buy order price specified by the buy order. The selling intervention setting price is, for example, input in advance to the management device 10 by the manager and stored in the storage unit 14 of the management device 10.

(Step S431)

First, the management device 10 deletes, from the account information storage area 142, the account information of the management device 10 and the cryptocurrency ID for which the selling intervention has been established, and stores the account information specified by the buy order and the cryptocurrency ID for which the buying and selling has been established in the account information storage area 142 in association with each other. Thus, the cryptocurrency is transferred from the manager acting as a seller to the user of the user device 21 as a buyer, and the fact that the cryptocurrency has been transferred is recorded on the management device 10.

(Step S432)

Next, the management device 10 stores the cryptocurrency ID for which the selling intervention has been established and history information indicating that the selling intervention has been performed in the history information storage area 143 in association with each other. Thus, the fact that the selling intervention for the cryptocurrency has been performed is recorded on the management device 10.

(Step S433)

The management device 10 preferably adds a price for which the selling intervention has been established to an asset balance stored in the asset information storage area 144. Thus, the asset balance of the manager can be accurately managed.

(Step S434)

The management device 10 preferably transmits a buying and selling establishment notification to the user device 21. Thus, the user of the user device 21 is notified of the establishment of the buying and selling of the cryptocurrency.

According to the first embodiment described above, fraud on cryptocurrencies can be detected using cryptocurrency IDs without using enormous calculation amounts. Accordingly, the management device 10 and the cryptocurrency system 1 capable of smoothly operating an entire system can be provided.

Further, according to the buying and selling mediating conditions and the buying intervention conditions of the embodiment, the unauthorized buying and selling of cryptocurrencies and the incorrect exercise of buying intervention can be prevented. That is, provided that account information specified by sell orders is stored in the account information storage area 142 so as to be associated, the unauthorized selling of cryptocurrencies by persons having no account information can be prevented. Further, provided that cryptocurrency IDs stored in association with account information specified by sell orders are stored in the issued information storage area 141, the selling of unissued cryptocurrencies can be prevented. Further, provided that cryptocurrency IDs stored in association with account information specified by sell orders are stored in the history information storage area 143 in association with history information, the unauthorized selling of cryptocurrencies having no history information (for example, cryptocurrencies having not been issued) can be prevented. Further, since conditions are not met when fraud is found in any one of the three storage areas, the implementation of buying and selling mediating processing and buying intervention processing in a case in which the falsification of the information of any one of the three storage areas can be effectively prevented.

Since existing cryptocurrencies as represented by bit coins do not have the function of maintaining their values, the prices of the cryptocurrencies may sharply drop. However, according to the embodiment, cryptocurrencies are issued in trade for prices. Therefore, cryptocurrencies having the function of maintaining their values can be created. Further, the values of cryptocurrencies can be secured by the detection of fraud in the mediation of buying and selling. In addition, sharp drops in values can be directly prevented by the implementation of buying intervention. Thus, according to the embodiment, a value maintaining function is assigned to issued cryptocurrencies as one of elements needed as widely-circulating currencies, whereby cryptocurrencies having secured values can be provided.

According to the embodiment, the management device 10 (a management device 51 belonging to, for example, a top layer that will be described later in a case in which a plurality of management devices 10 is connected to the network 30; hereinafter, the same applies to this paragraph) on the network 30 is regarded as a central bank, and unique cryptocurrencies can be issued from the management device 10 regarded as the central bank. As for currently-mainstream cryptocurrencies, since miners consuming CPU time, power, and personnel costs receive prices for the issue of the cryptocurrencies based on the concept of mining, there are no values supporting the values of the cryptocurrencies themselves. On the other hand, according to the embodiment, with the issue or circulation of cryptocurrencies issued by the management device 10, CPU time, power, and personnel costs can be effectively reduced. Further, cryptocurrencies issued by the management device 10 are distributed into the markets when users such as individuals and corporations exchange other currencies. As a result, asset balances (foreign currency reserves) are accumulated in the asset information storage area of the management device 10 simultaneously with the issue. With the accumulation of the asset balances (foreign currency reserves), the management device 10 can buy the cryptocurrencies (buying intervention) from the markets when the market prices of the cryptocurrencies issued by the management device 10 itself drop. Further, according to the embodiment, sharp drops in the prices are easily reduced compared with other cryptocurrencies in such a way that the issue prices are risen for each issue of the cryptocurrencies. Further, according to the embodiment, the prices of the cryptocurrencies can be based on the supply and demand of the markets, the number of the issued cryptocurrencies is automatically set based on market prices, and labor forces needed to maintain systems can be reduced. The manager can receive various prices such as dollar, euro, SDR, yen, yuan, and pound in return for the cryptocurrencies by the management device 10, and these prices are added to asset balances. Such asset balances have properties as foreign currency reserves and have the function of maintaining values in the cryptocurrencies.

Cryptocurrency System 2 According to Second Embodiment

Figure 8:
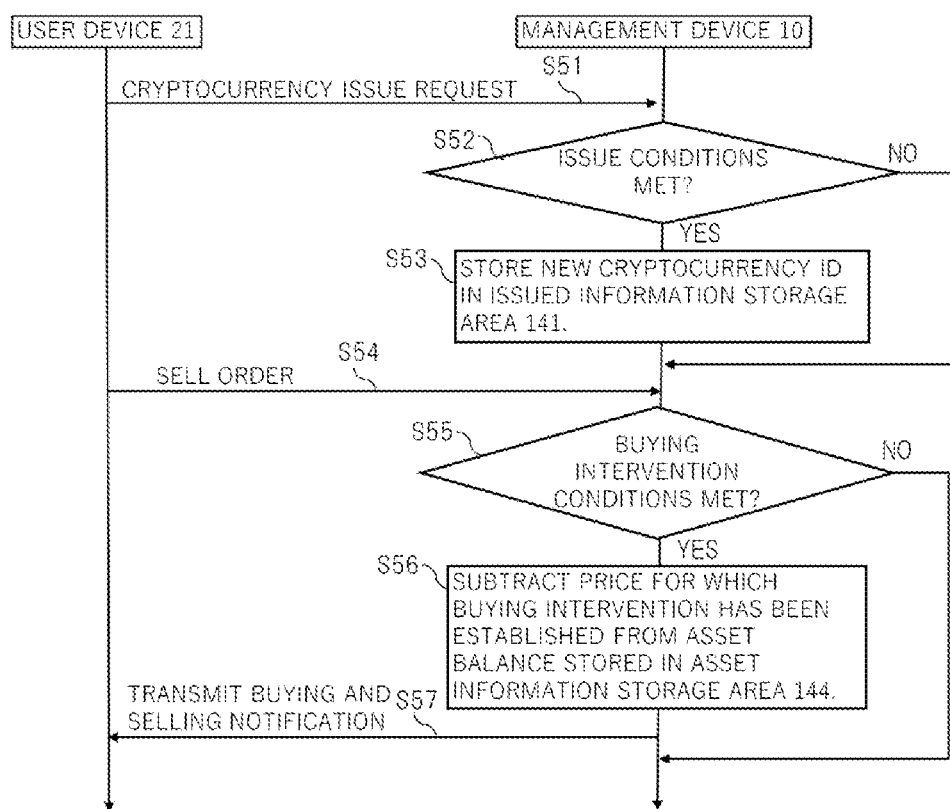
FIG. 8 is a sequence for describing an operation example of a cryptocurrency system according to a second embodiment.

FIG. 8 is a sequence for describing an operation example of a cryptocurrency system according to a second embodiment. As shown in FIG. 8, a management device 10 in a cryptocurrency system 2 according to the second embodiment determines the propriety of issue conditions including the receiving condition of the price of a cryptocurrency (step S52) when receiving a cryptocurrency issue request specifying account information from a user device 21 (step S51). When the issue conditions are met, the management device 10 stores a new cryptocurrency ID in an issued information storage area 141 (step S53). Further, the management device 10 determines the propriety of buying intervention conditions including a condition in which a target price is a prescribed buying intervention setting price or less (step S55) when receiving a sell order specifying account information from the user device 21 (step S54). When the buying intervention conditions are met, the management device 10 subtracts a price for which the buying intervention has been established from an asset balance stored in an asset information storage area 144 (step S56). The management device 10 preferably transmits a buying and selling establishment notification to the user device 21 after the completion of step S56 (step S56). According to the second embodiment, the management device 10 is allowed to automatically perform buying intervention processing (without someone's help) when prescribed conditions are met and thus can promptly and accurately prevent sharp drops in the prices of cryptocurrencies.

Cryptocurrency System 3 According to Third Embodiment

Figure 9:
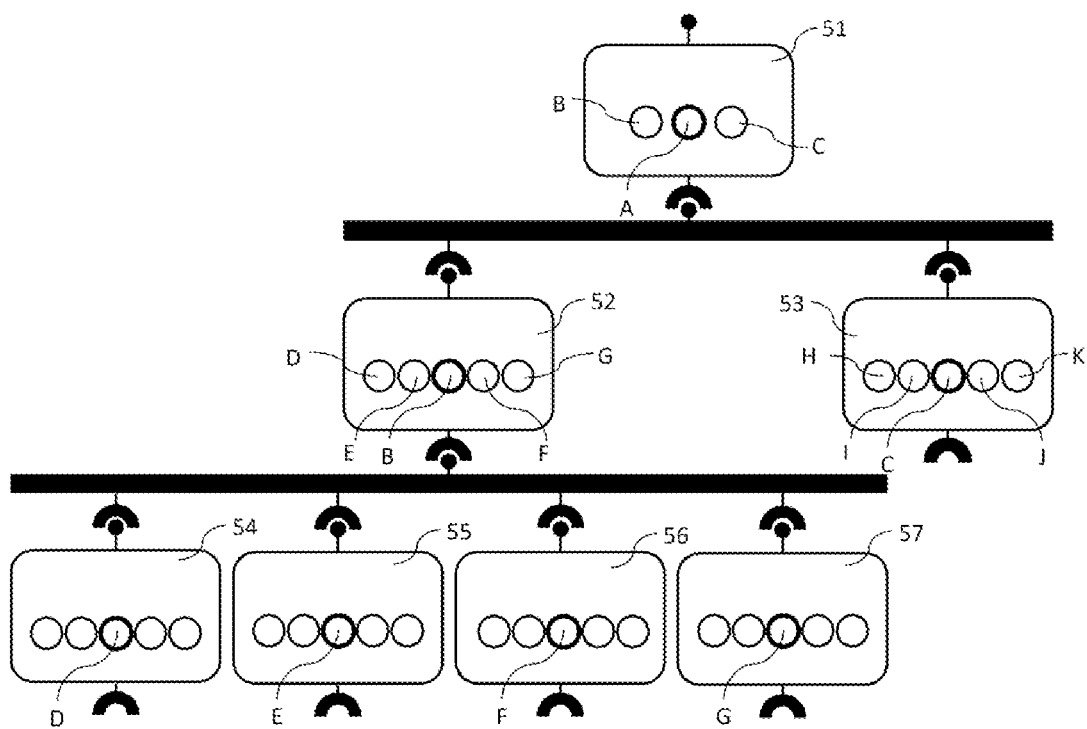
FIG. 9 is a sequence for describing an operation example of a cryptocurrency system according to a third embodiment.

FIG. 9 is a sequence for describing an operation example of a cryptocurrency system according to a third embodiment. As shown in FIG. 9, a cryptocurrency system 3 according to the third embodiment is a cryptocurrency system including a plurality of management devices 51 to 57 hierarchized in a tree form and connected to each other. A management device belonging to one hierarchy includes an issued information storage area for the own device and issued information storage areas for other devices. The issued information storage areas for other devices store information stored in issued information storage areas for own devices provided in management devices belonging to a hierarchy immediately below the one hierarchy. That is, the information is shared (or synchronized) between the issued information storage areas for other devices and the issued information storage areas for the own devices provided in the management devices belonging to the hierarchy immediately below the one hierarchy. The management devices 52 and 53 belonging to a second hierarchy are connected immediately below the management device 51 belonging to a first hierarchy, and the management devices 54, 55, 56, and 57 belonging to a third hierarchy are connected immediately below the management device 52 belonging to the second hierarchy.

Specifically, the management device 51 in the top layer includes an issued information storage area A for the own device and issued information storage areas B and C for other devices. Further, the management device 52 belonging to the second hierarchy includes an issued information storage area B for the own device and issued information storage areas D, E, F, and G for other devices. Further, the management device 53 belonging to the second hierarchy includes an issued information storage area C for the own device and issued information storage areas H, I, J, and K for other devices. Further, the management devices 54, 55, 56, and 57 belonging to the third hierarchy respectively include issued information storage areas D, E, F, and G for the own devices and issued information storage areas for other devices. The issued information storage areas B and C for other devices provided in the management device 51 in the top layer store information stored in the issued information storage areas B and C for the own devices provided in the management devices 52 and 53 belonging to the second hierarchy and connected immediately below the management device 51 belonging to the top layer. Further, the issued information storage areas D, E, F, and G for other devices provided in the management device 52 belonging to the second hierarchy respectively store information stored in the issued information storage areas D, E, F, and G for the own devices provided in the management devices 54, 55, 56, and 57 belonging to the third hierarchy and connected immediately below the management device 52 belonging to the second hierarchy.

According to the third embodiment, since a user device is allowed to perform the transmission of a cryptocurrency issue request, the transmission of a sell order or a buy order, or the like to any of the plurality of management devices 51 to 57, traffic loads in the cryptocurrency system 3 can be dispersed. Further, since issued information storage areas are shared between a management device belonging to one hierarchy and management devices belonging to a hierarchy immediately below the one hierarchy, fraud can be easily detected by comparing contents stored in issued information storage areas for other devices provided in the management device belonging to the one hierarchy with contents stored in issued information storage areas for own devices provided in the management devices belonging to the hierarchy below the one hierarchy and determining whether they match.

Note that although their illustrations and detailed descriptions are omitted, an account information storage area and a history information storage area can also be shared (or synchronized) between a management device belonging to one hierarchy and management devices belonging to a hierarchy immediately below the one hierarchy like the case of the issued information storage area.

In the third embodiment, writing and reading information in and from at least one of: issued information storage areas for own devices; account information storage areas for own devices; and history information storage areas for own devices may be prohibited, and writing and reading information in and from at least one of: issued information storage areas for other devices; account information storage areas for other devices; and history information storage areas for other devices may be prohibited. Thus, the functions of management devices belonging to lower hierarchies can be limited according to the rights of the managers of the management devices belonging to the lower hierarchies. Therefore, in a case in which the managers of the management devices belonging to the lower hierarchies have rights to mediate buying and selling but do not have rights to issue cryptocurrencies or the like, the functions of the management devices belonging to the lower hierarchies can be appropriately limited.

The plurality of management devices 51 to 57 may be directly connected to each other, may be connected to each other via other devices, or may be connected to each other via networks such as the Internet and dedicated lines.

Other

In the specification, the transmission or reception of one request or one order specifying one information indicates, for example, a case in which the one information is received before and/or after the reception of the one request in association with the one request, a case in which the one information itself is not received but the one information can be specified from the received one request, or the like, besides a case in which the one request or the one order including the one information itself is received.

Further, in the specification, the deletion of one information, one data, or the like stored in one area indicates a case in which the information, the data, or the like is invalidated without being deleted in the area to be substantially deleted (for example, a case in which other information or other data indicating invalidity is stored in a record (row) or the like in which the information, the data, or the like is stored), besides a case in which the information, the data, or the like is actually deleted from the area (for example, a case in which a record (row) in which the information, the data, or the like is stored is actually deleted).

Further, in the specification, one request, one order, or the like may be sent and received as one data, or may be sent and received as a plurality of divided data items. Further, one request, one order, or the like may be sent and received at a time, or may be separately sent and received a plurality of times. Further, one request, one order, or the like may be singly sent and received, or may be sent together with other information. For example, the one request, the one order, or the like may be sent and received in such a way that information such as a header is added to the one request, the one order, or the like to constitute one or a plurality of packets and the one or the plurality of packets is sent and received.

Central banks, private banks, or the like in all the countries can further issue new cryptocurrencies or real currencies of which the values are supported by cryptocurrencies issued by the management device 10.

The descriptions of the embodiments are given above, but configurations in the claims are not limited to the descriptions.

REFERENCE SIGNS LIST 1, 2, 3 Cryptocurrency system
10 Management device
12 Calculation unit
14 Storage unit
141 Issued information storage area
142 Account information storage area
143 History information storage area
144 Asset information storage area
145 Issue number storage area
21, 22 User device
30 Network
51 to 57 Management device

The invention claimed is:
1. A system comprising: a plurality of management devices hierarchized in a tree form and connected to each other, wherein
a management device, of the plurality of management devices, includes:
a processor; and
a respective storage area configured to be accessed by the processor for the management device and respective storage areas for one or more other management devices,
the respective storage areas for the one or more other management devices provided in the management device, belonging to one hierarchy, store information stored in respective issued information storage areas for own devices provided in one or more of the plurality of the management devices belonging to a hierarchy immediately below the one hierarchy, and the respective storage areas for the one or more other management devices provided in the management device, belonging to the one hierarchy, do not store information stored in respective issued information storage areas for own devices provided in one or more of the plurality of management devices belonging to a hierarchy two or more below the one hierarchy, wherein the management device belonging to the one hierarchy is connected to the one or more of the plurality of management devices belonging to the hierarchy immediately below the one hierarchy, wherein the management device is configured to detect fraud of cryptocurrency by comparing contents stored in the respective storage areas for the one or more other management devices included in the management device belonging to the one hierarchy with contents stored in the respective issued information storage areas for own devices provided in the one or more of the plurality of management devices belonging to the hierarchy immediately below the one hierarchy, and wherein the system is further configured to detect fraud of cryptocurrency by determining whether the contents stored in the respective storage areas for the one or more other management devices and the contents stored in the respective issued information storage areas for own devices provided in the one or more of the plurality of management devices match.

2. The system according to claim 1, wherein the respective storage areas for the one or more other management devices store information stored in issued information storage areas for own devices provided in the one or more of the plurality of management devices belonging to the hierarchy immediately below the one hierarchy.

3. A management device, of a plurality of management devices, including:
a processor;
a respective storage area configured to be accessed by the processor for the management device and respective storage areas for one or more other management devices,
the respective storage areas for the one or more other management devices provided in the management device, belonging to one hierarchy, store information stored in respective issued information storage areas for own devices provided in one or more of the plurality of the management devices belonging to a hierarchy immediately below the one hierarchy, and
the respective storage areas for the one or more other management devices provided in the management device, belonging to the one hierarchy, do not store information stored in respective issued information storage areas for own devices provided in one or more of the plurality of management devices belonging to a hierarchy two or more below the one hierarchy,
wherein the management device belonging to the one hierarchy is connected to the one or more of the plurality of management devices belonging to the hierarchy immediately below the one hierarchy,
wherein the management device is configured to detect fraud of cryptocurrency by comparing contents stored in the respective storage areas for the one or more other management devices included in the management device belonging to the one hierarchy with contents stored in the respective issued information storage areas for own devices provided in the one or more of the plurality of management devices belonging to the hierarchy immediately below the one hierarchy, and wherein the management device is further configured to detect fraud of cryptocurrency by determining whether the contents stored in the respective storage areas for the one or more other management devices and the contents stored in the respective issued information storage areas for own devices provided in the one or more of the plurality of management devices match.

4. The management device according to claim 3, wherein the respective storage areas for the one or more other management devices store information stored in issued information storage areas for own devices provided in the one or more of the plurality of management devices belonging to the hierarchy immediately below the one hierarchy.

5. A system comprising: a plurality of management devices hierarchized in a tree form and connected to each other, wherein a management device, of the plurality of management devices, includes:
a processor;
a respective storage area configured to be accessed by the processor for the management device and respective storage areas for one or more other management devices; and
means for, with the respective storage areas for the one or more other management devices provided in the management device, belonging to one hierarchy, storing information stored in respective issued information storage areas for own devices provided in one or more of the plurality of the management devices belonging to a hierarchy immediately below the one hierarchy, and
means for, with the respective storage areas for the one or more other management devices provided in the management device, belonging to the one hierarchy, not storing information stored in respective issued information storage areas for own devices provided in one or more of the plurality of management devices belonging to a hierarchy two or more below the one hierarchy,
wherein the management device belonging to the one hierarchy is connected to the one or more of the plurality of management devices belonging to the hierarchy immediately below the one hierarchy,
wherein the management device further includes means for detecting fraud of cryptocurrency by comparing contents stored in the respective storage areas for the one or more other management devices included in the management device belonging to the one hierarchy with contents stored in the respective issued information storage areas for own devices provided in the one or more of the plurality of management devices belonging to the hierarchy immediately below the one hierarchy, and
wherein the management device further includes means for detecting fraud of cryptocurrency by determining whether the contents stored in the respective storage areas for the one or more other management devices and the contents stored in the respective issued information storage areas for own devices provided in the one or more of the plurality of management devices match.

6. The system according to claim 5, wherein the management device further includes means for, with the respective storage areas for the one or more other management devices, storing information stored in issued information storage areas for own devices provided in the one or more of the plurality of management devices belonging to the hierarchy immediately below the one hierarchy.

* * * * *